United States Patent [19]

Crawford et al.

[11] Patent Number: 4,478,747
[45] Date of Patent: Oct. 23, 1984

[54] BIOLOGICALLY PRODUCED ACID PRECIPITABLE POLYMERIC LIGNIN

[75] Inventors: Don L. Crawford; Anthony L. Pometto, III, both of Moscow, Id.

[73] Assignee: Genetics International, Inc., Boston, Mass.

[21] Appl. No.: 493,024

[22] Filed: May 9, 1983

Related U.S. Application Data

[63] Continuation-in-part of Ser. No. 376,951, May 11, 1982, abandoned.

[51] Int. Cl.³ ............................................... C07G 1/00
[52] U.S. Cl. ................................. 435/72; 260/124 R
[58] Field of Search ........................................ 260/124

[56] References Cited

PUBLICATIONS

Crawford, Don L., "Lignocellulose Decomposition by Selected Streptomyces Strains", Applied and Environmental Microbiology 35 (No. 6): 1041–1045 (Jun., 1978).
Crawford, Don L., "Bioconversion of Plant Residues Into Chemicals: Production of Chemicals From Lignin", Biosources Digest 2: (1) 52–63 (1980).
Crawford, Don L. et al., "Microbial Degradation of Lignin", Enzyme Microbial Technol., 2: 11–22 (Jan., 1980).
Kirk, T. Kent et al., "Methoxyl-deficient Structural Elements in Lignin of Sweetgum Decayed by a Brown-rot Fungus", Acta Chemica Scandinavica 24: 3379–3390 (1970).
Daniels, Farrington et al., *Physical Chemistry*, 3rd edition, John Wiley & Sons, N.Y., 1966, pp. 381–385.
Aulin-Erdtman, Gunhild, "Studies on Ultra-Violet Absorption Changes Caused by Modifications of Chromophores, With Special Reference To Lignin Chemistry", Svensk Kemisk Tidskritf 70: 4 (1958) pp. 146–156.
Antai et al. (1981) Applied and Environmental Microbiology 42 (8): 378–380, and abstract ABIPC 52 (6): 605 (No. 5576) (1981).
Minlon (1946) J. Am. Chem. Soc. 68: 2487–2488.
Augustine (1969) Oxidation, vol. I, Ch. 2, *Techniques And Applications In Organic Synthesis*, p. 244 (Marcel Dekker, N.Y. N.Y.).
Cole et al. (1982) J. Agric. Food Chem. 30: 719–724.
Scott (1965) Atmospheric Oxidation and Antioxidants Elsevier Publ. Co. N.Y. N.Y.
Crawford et al., (1983) Applied and Environmental Microbiology 45 (3): 898–904.

*Primary Examiner*—Delbert R. Phillips

[57] ABSTRACT

A water soluble, acid precipitable polymeric degraded lignin (APPL), having a molecular weight of at least 12,000 daltons, and comprising, by percentage of total weight, at least three times the number of phenolic hydroxyl groups and carboxylic acid groups present in native lignin. The APPL may be modified by chemical oxidation and reduction to increase its phenolic hydroxyl content and reduce the number of its antioxidant inhibitory side chains, thereby improving antioxidant properties.

11 Claims, No Drawings

BIOLOGICALLY PRODUCED ACID PRECIPITABLE POLYMERIC LIGNIN

This invention was made with U.S. Government support, and the U.S. Government has certain rights in the invention.

BACKGROUND OF THE INVENTION

This application is a continuation in part of our currently pending U.S. application Ser. No. 376,951, filed May 11, 1982, now abandoned which is hereby incorporated by reference.

This invention relates to novel polymers produced by metabolic action of Streptomyces bacteria and other microbes on naturally occuring lignin and lignocellulose.

Natural lignin, readily available from numerous sources, is water insoluble and relatively unusable. Various fungi and bacteria, including Streptomyces, are known to degrade lignin and lignocellulose into industrially useful low molecular weight (single ring) phenolic compounds. Crawford, "Lignocellulose Decomposition By Selected Streptomyces Strains", Applied Environmental Microbiology 35 (No. 6): 1041 (June 1978); Crawford et al., "Microbial Degradation of Lignin", Enzyme Microbial Technology 2:11 (1980). It has been recognized also that unspecified residual polymers may undergo general chemical modifications including formation of phenolic and carboxylic groups. Crawford, "Bioconversion of Plant Residues Into Chemicals: Production of Chemicals From Lignin", Biosources Digest 2:52 (1980). However, no specific modified polymers are recognized, recovered, or characterized in such art.

SUMMARY OF THE INVENTION

The present invention comprises a novel polymeric degraded lignin. The polymer: has a molecular weight of at least 12,000 daltons; is water soluble and precipitates at acid pH levels; and is characterized by at least a three-fold increase (compared to the native lignin) in the number of phenolic hydroxxyl groups and carboxylic acid groups.

Native lignin as used in the context of the invention means any naturally occuring lignin, such as that available from grasses, plants or trees; the lignin may be used by itself or in combination with other materials, e.g., as lignocellulose. Preferably, the native lignin is a grass-type lignocellulose.

The Streptomyces is a strain known to degrade lignin. Three strains of Streptomyces preferably used with this invention (*S. viridosporus* T7A, *S. setonii* 75Vi2, and *S. badius* 252) have been isolated from Idaho soil and deposited with the American Type Culture Collection where they are designated, respectively, by the numbers 39,115; 39,116; and 39,117.

The polymer is produced by incubating native lignin with Streptomyces in a culture medium, extracting the culture medium with aqueous solvent, acidifying the extract, and collecting the resulting precipitate.

Polymeric lignin may be modified by oxidation to its antioxidant capacity by enhancing its phenolic hydroxyl content, and by reduction to reduce the number of substituents which inhibit antioxidant properties. Preferably, the antioxidant-inhibiting substituents which are removed or altered are α-carbonyl groups or aromatic carboxylic acid groups; the oxidation step is either accomplished under basic conditions or by exposing the APPL to $FeSO_4$ and $H_2O_2$; and the process may depolymerize the polymeric lignin. The resulting product may be mixed with a food as a method of preserving it.

DESCRIPTION OF THE PREFERRED EMBODIMENT

More specifically, the lignocellulose is solvent-extracted from the raw plant, air dried, and sterilized. An aqueous medium is prepared, consisting of an inorganic mineral nutrient or salt together with a co-substrate such as yeast or other well-known distiller solubles. The medium is sterilized and inoculated with spores of the Streptomyces, after which it is incubated with the lignocellulose under conditions permitting Streptomyces metabolism, e.g., at temperatures between 20° C. and 50° C. at a pH of between 6.8 and 7.5. APPL begins to be produced by at least 48 hours and accumulates in significant amounts by 72 hours; measurable production can still occur after eight weeks. Incubation can be performed in a semisolid (e.g., liquid equal to 1.5 times the water-holding capacity of the lignocellulose, which is 6.8 ml/gram for corn lignocellulose) medium or in a dilute medium, so long as there are sufficient nutrients to permit Streptomyces metabolism.

After incubation, deionized water (about 100 ml per gram of lignocellulose) is added to the culture vessel, and the mixture is streamed at 100° C. for about one hour. The solvent used should have a pH level that will allow it to dissolve the APPL, e.g., from pH of 6.5 up into the basic range. Residual solid is filtered and removed. The filtrate is acidified to pH 1–2, and the resulting precipitate is separated and air dried.

Characterization of the Acid Precipitable Polymeric Lignin (APPL) so produced shows the APPL is derived from the native lignin; however, the APPL is significantly modified (e.g., by degration of the lignin itself or polymerization of lignin-degradation products). The APPL is a more active polymer than the native lignin, as indicated by the increase in phenolic hydroxyl groups and carboxylic acid groups mentioned above. Longer periods of incubation will increase the relative percentages of phenolic hydroxyl groups. For example, APPL initially produced may have about 0.7% by weight phenolic hydroxyl groups (as compared to 0.2% for native lignin), and APPL harvested after several weeks may have 0.8% or more of such groups. APPL typically has at least 35% oxygen (by weight) as compared to 30–32% for native lignin. The carboxylic acid content of the APPL represents a significant (at least three-fold) increases over the low levels present in native lignin.

The phenolic hydroxyl groups in the APPL are readily ethylated and converted to single-ring phenolic compounds by chemical oxidation yielding etherified acids, e.g., using the permanganate method of Kirk and Adler, reported in "Methoxyl-Deficient Structural Elements in Lignin Sweetgum Decayed by a Brown-Rot Fungus", Acta Chem. Scand. 24:3379–3390 (1970). Such oxidation yields a substantially greater (at least 3 times) number of single-ring phenolic compounds than is the case with native lignin, and APPL's provide at least 25% yields of such compounds. Typically, over one-half of the single-ring phenolic cmpounds yielded by chemical oxidation of APPL's are from the following groups of compounds: p-hydroxybenzoid acid; 4-hydroxy-3 methoxy benzoid acid (vanillic acid); and 4-hydroxy-3, 5, dimethyl benzoic acid (syringic).

The presence of a relatively large number (compared to native lignin) of "free" (readily ethylatable) phenolic hydroxyl groups may indicate that Streptomyces-moderated modifications to the native lignin are especially likely to be carried out on surface subunits of the lignin.

Finally, the APPL yields about b 5% by weight esterified phenolic compounds (at least one-half of which are p-courmaric acid and ferulic acid) that can be recovered by mild alkaline hydrolysis.

Specific examples of preparation and characterization of APPL's according to the present invention follow.

A.

PREPARATION OF APPL'S

Example 1

Dried corn lignocellulose was ground to pass a 20 mesh screen and then extracted in sequence with hot water, benzene-ethanol (1—1), ethanol, and hot water. The lignocellulose was air-dried.

Five grams of dry corn lignocellulose was autoclaved in an open 1 liter reagent bottle (Corning #1460) for 1 hr at 121° C. and then for another 1 hr with the bottle stoppered with a cotten plug. The inoculation medium consisted of 51.0 ml of mineral units (1 g $KH_2PO_4$, 4 g $Na_2HPO_4$, 0.2 g NaCl, 0.2 g $MgSO_4 \cdot 7H_2O$ and 0.05g $CaCl_2$ per liter of deionized water), pH 7.2-7.4, supplemented with 0.2% (w/v) yeast extract (Difco). This medium was sterilized by autoclaving (121° C. for 15 min.), cooled, inoculated with spores from S. viridosporous T7A, and placed on an orbital shaker at 37° C. for 24 hr. This inoculum containing actively growing cells was then poured aseptically into the bottles containing lignocellulose. The bottles were then turned on their sides. The culture vessels were rolled on the bench top to spread the lignocellulose evenly over the walls of the bottle. Vessels were then incubated for 6 weeks at 37° C. Controls, inoculated with sterile medium, were run simultaneously.

After 6 weeks incubation, 500 ml of deionized water was added to the culture vessel (100 ml/g of lignocellulose). The bottles were then placed into a steamer at 100° C. for 1 hr. Afterwards all residual solids were filtered onto preweighed filter paper. This residue plus paper was collected and transferred to a preweighed beaker. The residue was allowed to air-dry and was analyzed.

The filtrate was acidified to pH 1-2 with 12 M HCl. The acid precipitable polymeric lignin (APPL) was allowed to settle out overnight. Then, most of the liquid was decanted off. The APPL was then collected by centrifugation at 25,000×g. It was then placed into a preweighed beaker and air-dried in an oven at 80°-100° C. After drying and equilibration to room temperature, the beaker was reweighed to establish the amount of APPL recovered. The remaining acidified supernatant was extracted twice with diethyl ether and twice with ethyl acetate. These extracts were dewatered with $NaSO_4$ and then decanted into a preweighed beaker. They were allowed to evaporate in the hood. After evaporation the beakers were reweighed to determine the yield of low molecular weight extractives recovered.

Examples 2 and 3

A procedure similar to that followed in example 1 was used with S. badius 252 (incubation temperature 37° C.) was with S. setonii 75 Vi2 (incubation temperature 45° C.).

Example 4

Five gram portions of dry lignocellulose are placed in flasks and sterilized by autoclaving. Each flask is inoculated with spores from an agar slant of a Steptomyces strain. For inoculation the spores are suspended in 50.0 ml of sterile 0.3% (w/v) yeast extract. The inoculated lignocellulose is incubated standing at 35°-37° C. for 72-92 hr. Afterwards, sterile liquid medium is added to each flask to bring the final volume up to 1250 ml. The liquid medium consists of the mineral salts solutions supplemented with 0.3 to 0.6% (w/v) yeast extract. Cultures are then incubated shaking at 37° C. for 2-4 weeks. Then products are harvested as described above.

Examples 5-8

S. viridosporus T7A was grown from quack grass (Agropyron repens), alfalfa (Medicago sativa), maple (Acer platanoides) and spruce (Picea pungens) using the procedure outlined in Example 4.

Yields of APPL from various native lignins using S. viridosporus T7A are summarized below in Table 1.

TABLE 1

APPL yields from softwood, hardwood, grass and alfalfa lignocelluloses after 875 hr incubation in liquid culture with S. viridosporus T7A.

| Source of Lignocellulose* | Mg APPL Produced | % of Initial Lignin** |
|---|---|---|
| Corn | 16.3 | 24.3 |
| Quackgrass | 17.7 | 25.8 |
| Spruce | 5.8 | 6.3 |
| Maple | 8.6 | 10.2 |
| Alfalfa | 11.0 | 16.8 |

*Corn (Zea mays); quackgrass (Agropyron repens); spruce (Picea pungens); maple (Acer platanoides); alfalfa (Medicago sativa).
**Based upon 0.5 grams of lignocellulose and Klason lignin contents of 24.3% (corn), 25.8% (quackgrass), 34.5% (spruce), 29.3% (maple) and 25.0% (alfalfa).

Examples 9-12

The procedure described above for example 1 was applied using two strains of Streptomyces (Streptomyces strain 225 and strain 523), that are distinctly different from S. viridosporous, S. setonii, or S. badius, to degrade corn stover lignocellulose. In addition, the procedure was used with two white rot fungi (Coriolus versicolor and Phanerochaete chyrsosporium) to degrade corn stover lignocellulose. The results are summarized in Table 2, below:

TABLE 2

Lignocellulose decomposing abilities of and properties of APPL's generated by two Streptomyces and two white-rot fungi.

| Organism | Lignocellulose Weight loss (%) | % Lignin Loss | % Carbohydrate Loss | Mg APPL Produced | Molecular Weight of APPL (daltons) | Enrichment of APPL's in Phenolic Hydroxyl and Carboxyl Groups[a] |
|---|---|---|---|---|---|---|
| Stretopomyces strain 225 | 47.2 | 18.4 | 67.0 | 206.0 | >12,000 | + |

TABLE 2-continued

Lignocellulose decomposing abilities of and properties of APPL's generated by two Streptomyces and two white-rot fungi.

| Organism | Lignocellulose Weight loss (%) | % Lignin Loss | % Carbohydrate Loss | Mg APPL Produced | Molecular Weight of APPL (daltons) | Enrichment of APPL's in Phenolic Hydroxyl and Carboxyl Groups[a] |
|---|---|---|---|---|---|---|
| Streptomyces strain 523 | 53.2 | 28.8 | 69.8 | 285.5 | >12,000 | + |
| Coriolus versicolor | 39.2 | 23.6 | 41.0 | 118.0 | >12,000 | + |
| Phanerochaete chrysosporium | 61.3 | 44.5 | 64.4 | 51.3 | >12,000 | + |
| Streptomyces viridosporus T7A | 36.2 | 19.7 | 44.4 | 487.4 | >12,000 | + |

[a]A + value indicates that the APPL contained greater than 3 times by percentage total weight the number of phenolic hydroxyl and carboxyl groups as compared to native lignin.

B
CHARACTERIZATION OF APPL'S

Molecular weight of the APPL's was determined by permeation chromatography. One mg of APPL produced from corn lignocellulose was dissolved in 1.0 ml of 0.1M NaOH containing 0.1M LiCl and its molecular weight distribution determined on a Sephadex G-50 column utilizing the following chromatographic conditions: column, 670×15 mm solvent, 0.1M NaOH containing 0.1M LiCl; flow rate, 0.64 ml/min.; void volume, 38 ml as shown by exclusion of Dextran Blue 2000 (Sigma Chem Co., St. Louis, Mo.). Elution of APPL's was monitored by measuring the absorbence at 280 nm of 2 ml fractions. APPL's were excluded (passed out of the column) in a sharp peak corresponding to the void volume. Their exclusion by Sephadex G-50 indicates an average molecular weight of at least 20,000 daltons as determined experimentally by passage of polyethelene glycols of varying molecular weights through the column. Other APPL's, such as those produced from wood lignin, can be lower in molecular weight, e.g. about 12,000 daltons.

Known analytic techniques establish that the APPL is derived from native lignin, but is significantly modified as described above.

Lignin derivation is established by chemical degradation in acidic dioxane yielding phenyl propanoid ketols such as 1-hydroxy-3-[4-hydroxy-3 methoxy phenyl]-2-propanone and its coumaryl and syringyl analogues. Another analytic technique involves $^{14}C$ labeling of the lignocellulose substrate, and analysis of the resulting $^{14}C$ labelled APPL.

Modification of native lignin is established, for example, by permanganate oxidation after ethylation to yield ethoxylated benzoic acids which can be quantified by gas chromatography of trimethylsilyl derivaties by the method of Kirk and Adler, cited above. The results (corrected for contaminating substances in the original preparation) of permanganate oxidation are summarized below in Table 3. In the table, control APPL represents the acid precipitable entity from a control incubated without Streptomyces and subjected to identical harvesting procedures; T7A-APPL represents the S. viridosporus-altered corn lignin; and corn MWL (milled wood lignin) represents native lignin.

TABLE 3

Yields of "lignin-derived" products upon permanganate oxidation of corn MWL and APPL's from control and S. viridosporus T7A-decayed corn lignocelluloses.

| | % Recovered* | | |
|---|---|---|---|
| Lignin Source | VA | PHB | SA |
| Control APPL | 2.0 | 3.6 | 3.4 |
| T7A-APPL | 9.6 | 6.7 | 4.5 |
| Corn MWL | 3.4 | 6.4 | 2.8 |

*Yields were calculated as percentage of the lignin subjected to oxidation, after subtracting the amount of each compound which would be derived from esterified phenolic compounds. VA is vanillic acid; PHB is p-hydroxybenzoic acid; SA is syringic acid.

Esterified phenolic compounds can be selectively cleaved from the APPL by mild alkaline hydrolysis and then quantified by gas chromatography of TMS-derivatives. The results are shown in Table 4.

TABLE 4

Recoveries of esterified phenolic compounds upon mild alkaline hydrolysis of corn MWL and APPL's from control and S. viridosporus T7A-degraded corn lignocelluloses.

| | % Recovered* | | | | | |
|---|---|---|---|---|---|---|
| Lignin Source | CA | FA | SA | VA | PHB | Total |
| Control APPL | 0.31 | N.D. | 0.08 | N.D. | N.D. | 0.39 |
| T7A-APPL | 5.10 | 0.78 | 0.05 | N.D. | 0.03 | 5.96 |
| Corn MWL | 1.20 | 1.06 | 0.13 | N.D. | 0.05 | 2.44 |

*Yields were calculated as a percentage of the lignin subjected to alkaline hydrolysis (CA, p-coumaric acid; FA, ferulic acid; SA, syringic acid, VA, vanillic acid; PHB, p-hydroxybenzoic acid). Yields were not corrected for contaminating substances.

The above-described modifications of native lignin are confirmed by NMR spectroscopy which shows an apparent enrichment of the degraded APPL in carboxyl groups as compared to the control. To carry out NMR spectroscopy, APPL's were first dissolved in 0.01 M NaOH, then adjusted to pH 7.0 and lyophilized before being dissolved in a deuterated solvent (DMSO or $D_2O$).

Further functional group analysis is provided by ionization difference spectra as described by Aulin-Erdtman, Sv. Kem. Tidskr 70:145-156 (1958).

Such spectra were utilized to estimate the phenolic hydroxyl contact of the APPL's. The procedure is based upon the assumption that phenolic residues conjugated to benzyl carbonyls absorb light at 364 nm. Based upon a molar extinction coefficient of $2.2 \times 10^7$ $cm^2$/mole for conjugated phenols, the conjugated phenolic hydroxyl content of the Streptomyces-degraded APPL was $0.774 \times 10^{-2}$ grams/gram APPL, or approximately 0.8% (w/w). The corresponding value for the control APPL was $0.17 \times 10^{-2}$ grams/gram APPL, or approximately 0.2% (w/w). These values indicate that the degraded APPL was increased in phenolic hydroxyl content by about four-fold as compared to the control.

A key feature of the APPL is its solubility in neutral and basic aqueous media, and its insolubility when the media are acidified. By following the absorbence at 600 nm of APPL's dissolved in 0.015 M NaOH and titrated with 0.01 N HCl, it was possible to determine the pH where lignin precipitation began. For the *S. viridosporus*-degraded APPL, the value was about pH 5.0. The degraded APPL began precipitating from solution a full pH unit higher than the control and native lignin. Other APPL's can precipitate at less acid pH levels, e.g. up to 6.0.

Finally elemental analysis of APPL, relative to native lignin, is shown below:

|  | Native Lignin | APPL |
|---|---|---|
| Carbon | 60-65% | 52-56% |
| Hydrogen | 6-7% | 6-8% |
| Oxygen | 30-32% | 35-40% |

APPL's possess a significant number of uses as feedstocks for polyurethanes, adhesives, emulsifying agents, and in various chemical processes. APPL's are also useful as a source of low molecular weight phenolic compounds.

APPL's are useful, for example as a surfactant. Using standard procedures (*Physical Chemistry*, 3rd edition, by F. Daniels and R. A. Alberty, John Wiley and Sons, N.Y., 1966), a determination was made of the ability of an APPL to decrease the surface tension of aqueous solutions in a capillary, where surface tension, $\gamma = \frac{1}{2} h p g r$ (r=capillary radius, p=liquid density, h=height of the cylinder of liquid in the capillary, and g=acceleration of gravity). Surface tension is therefore, measured in dynes/cm.

The surface tension of pure water (25° C.) was found to be 71.1 dynes/cm. The surface tension of water containing 0.01 g/ml APPL in the presence of NaOH was 61.3 dynes/cm, a value about 14% lower than pure water. The tension of water containing 0.01 g/ml APPL in the presence of Ca(OH)$_2$ was 56.4 dynes/cm, or 21% lower than pure water.

C

SCALE-UP

The APPL production procedures described above may be scaled-up as follows to produce up to 100 grams of APPL per batch fermentation (carried out at 37° ±5° C. for 1-2 weeks). With an estimated yield of 0.1 gram APPL/gram lignocellulose, a single fermentation requires one kilogram of starting material using two solid state fermentors designed for kilogram scale fermentations. The vessels are carboys equipped for constant gestation with minimal agitation (use of a roller). Incubation is carried out in a walk-in 37° C. incubator. The fermentor design is the same as a fermentation set up that has been used on a smaller (5 gram) scale. Because the Streptomyces is grown on dampened lignocellulose, there is no need for a submerged culture fermentation system. The lignocellulose is corn stover, and the bioconversion strain is *S. viridosporus* T7A.

Scale up of the culture system to kilogram or higher amounts is done by the calculation of the weight of lignocellulose plug liquid medium optimal for the specific cylindrical culture vessel used, where $$W = (2dh(0.1 \text{ cm}))/(2.5)(D)$$

and, W=weight of lignocellulose to be used, in grams; d=diameter of the vessel, in cm; h=height of vessel, in cm; 0.1 cm=final thickness of dampened lignocellulose desired on the internal surface; and D=density of the lignocellulose, in ml/g. The volume (v) of liquid medium required is determined emirically and optimized, where $$v = 1.5(D)$$

v=ml of liquid inoculum containing active cells per gram of lignocellulose, and D=density of the lignocellulose in ml/g.

Distilled water (100 ml/g lignocellulose is added to the culture vessel after the desired incubation time, and the vessel is steamed (100° C., 1 hr). The mixture is then suction filtered (Whatman No. 1). Insoluble residues are air-dried and weighed to determine lignocellulose weight loss. APPL is recovered from the aqueous extract by acidification to pH≦2 with 12 M HCL. The resultant precipitate is collected by centrifugation, washed twice with distilled water, and then air-dried or lyophilized.

Alternatively, APPL is recovered by dialyzing aqueous extracts against distilled water followed by lyophilization. The sodium salt of the APPL is prepared by dissolving APPL in 0.1 N NaOH and dialyzing the solution against distilled water until the pH of the water external to the membrane is stabilized at 7.0-7.5. Then the APPL salt is collected and lyophilized.

D

MODIFICATION OF APPL'S TO ENHANCE ANTI-OXIDANT PROPERTIES

1. Background

Because of its high concentration of phenolic hydroxyl groups in combination with aromatic methoxyl groups, APPL's may be used as anti-oxidants. Hydroxyl and methoxyl groups in the ortho and para positions on aromatic rings are a characteristic of good phenolic antioxidants. An example of such an antioxidant is propyl gallate (PG) which contains a 3,4,5-trihydroxy ring-substitution pattern. Hydroxyl groups in phenolic anti-oxidants act as electron donors which protect other compounds from autooxidation by decomposing the hydroperoxides which usually initiate the autoxidation process (i.e., oxidation that occurs automatically as a result of the surrounding environment).

APPL's are particularly enriched in phenolic hydroxyl groups as a result of β-ether linkage cleavage reactions and ring demethylations catalyzed by Streptomyces. Yet, APPL's still contain numerous methoxyl groups in the ortho position relative to hydroxyls. Such structures promote antioxidant properties of APPL's. The antioxidant properties of APPL's are further improved by oxidizing them, e.g. to cleave side chains leaving a hydroxyl residue.

APPL derivatives are especially attractive as antioxidants because they can be cost effectively produced and no lignin fragment has ever been shown to be carcinogenic. Thus, higher concentrations of APPL antioxidants are feasible than is true with conventional antioxidants.

However, even though a compound has functional groups that are generally characteristic of good antioxidants, its usefulness for that purpose may be limited if it has other functional groups which promote autooxidation of other compounds. Certain Streptomyces-catalyzed oxidative reactions, particularly involving functional groups on lignin side chains, partially offset the enhancing effect of increased hydroxyl group content. Specifically, the small numbers of aromatic carboxylic acid groups and significant number of $\alpha$-carbonyl groups introduced into APPL's by Streptomyces can act as electron-attracting groups and reduce the effectiveness of APPL's as antioxidants.

Using model compounds, we have confirmed the particularly inhibitory effect of $\alpha$-carbonyl groups. Acetovanillone (3-methoxy-4-hydroxyacetophenone) contains an aromatic ring with a 4-hydroxy-3-methoxy substitution pattern similar to that found in APPL. It also contains an $\alpha$-carbonyl group in the a carbon of its side chain. This compound is a very poor antioxidant. However, when the $\alpha$-carbonyl is reduced to saturation, producing 3-methoxy-4-hydroxyethylbenzene, the reduced product is equivalent to propyl gallate in its ability to protect unsaturated lipids from autooxidation. Therefore, using a modification of the Wolff-Kishner procedure, we have chemically reduced the $\alpha$-carbonyl groups and other inhibitory groups present in the APPL's to greatly improve their antioxidant properties.

Thus APPL's can be used to create products with greatly improved antioxidant properties by oxidation and reduction procedures or combinations thereof. Two preferred procedures are outlined below; in the first, the APPL is subjected to an acidic oxidation, followed by a reduction procedure. In the second, APPL is subjected to an oxidation procedure under basic conditions.

2. Oxidation/Reduction Procedure

As indicated above, oxidative degradation of side chains, ring hydroxylations, and ring demethylations in APPL's, followed by reduction of the products formed, enhances the antiooxidant properties of APPL's. Alternatively, the APPL can be reduced and then oxidized. The starting materials are APPL's as described above, except that it is not essential to dry the APPL before subjecting it to these procedures.

Oxidation is accomplished using the following procedure. A. 0.1–1% solution (100 ml) of APPL is suspended in Fenton's reagent (aqueous 2 mM $FeSO_4$ plus 0.2 mM EDTA in 10 mM phosphate buffer) and purged with $N_2$. The solution is stirred at room temperature while 2.0 ml of 30% $H_2O_2$ is added. Stirring is continued and the solution is sampled periodically. The UV absorption spectrum (375–225 nm) of each sample is determined to monitor oxidative changes. When desired, the oxidized APPL's are harvested by precipitation with dilute acid. The resulting polymer product has undergone hydroxylations to yield additional phenolic hydroxyl groups.

Reduction can be accomplished by various procedures such as a standard catalytic hydrogenation or a sodium borohydride reduction. These procedures not only eliminate inhibitory side-chain substituents, but they increase the hydroxyl content of the APPL at the same time by converting inhibitory side chains such as $\alpha$-carbonyl groups to hydroxyl groups.

There are numerous other ways to reduce the APPL's, ranging such as the harsh Wolff-Kishner reduction according to the procedure reported in Minton (1946) J. Am Chem Soc. 68: 2487–2488, which reduces the carbonyl side chains all the way to saturation. Likewise, various acid degradation and oxidation procedures are available, and the order of oxidation and reduction may be reversed. Also, the oxidation product may be degraded with acid (HCl) before the reduction is performed.

3. Basic Oxidation

As an alternative to the above oxidation/reduction procedures, the APPL may be subjected to oxidation under basic conditions, thus cleaving the polymer bonds and yielding modified lignin polymer and low molecular weight (1–2 rings) structures. Such oxidation and degradation may be achieved using a Baeyer/Villiger rearrangement as described in Augustine (1969) *Oxidation*, Volume I, Ch. 2, *Techniques And Applications In Organic Synthesis*, p. 244 (Marcel Dekker, N.Y. N.Y.)

The resulting modified APPL's are then recovered from suspension and dried to produce the final product. The basic oxidation procedure also yields ether-extractable low molecular weight compounds.

E

WEIGHT GAIN PROCEDURE FOR DETERMINATION OF ANTITOXIDANT PROPERTIES

A weight gain procedure reported by Cole et al. (1982) J. Agric. Food Chem. 30:719–724, is used to determine the antioxidant properties of the APPL.

All glassware is rinsed in 8N $HNO_3$, then rinsed several times with deionized water and finally dried in a dust free oven. The standard unsaturated lipid (Safflower seed oil, Type I, Sigma Chemical Co., from *Carthamus tintorius* seed) is purified prior to use by passage through a column of neutral chromatographic alumina in an atmosphere purged of air and replaced with $N_2$.

To a 10.0 ml volumetric flask, 1.0 mg of standard or suspected antioxidant is added. The flask is then flushed with $N_2$ and filled to volume with purified safflower oil. Flask contents are mixed vigorously for one minute or more. Then, 1–2 grams of safflower oil-antioxidant mixture is transferred to a predesicated 30 ml beaker (three replicates). The initial weight of each beaker is determined (to 0.1 mg. accuracy), and the beakers are then placed in a dust free incubator at 60° C. The beakers are removed daily, equilibrated at room temperature in a desicator for 1–2 hours, and reweighed.

The 60° C. temperature dramatically speeds up the autooxidation rate of lipids as compared with the natural rate. This allows one to complete a single test in less than 2 weeks. Oxidation of the lipid leads to a substantial weight gain due to $O_2$ uptake (Scott (1965) Atmospheric Oxidation and Antioxidants Elsevier Publ. Co. N.Y. N.Y.). Once the reaction begins, weight gain reaches 20 mg/10 ml sample within 24 hr. The quality of an antioxidant is measured by the number of days it will protect the standard lipid from a 20 mg/ml weight gain. The better the antioxidant, the longer the weight gain is inhibited. Other antioxidant assays involve direct measurement of $O_2$ uptake by lipids and/or peroxide accumulation in the lipid.

Results using the weight gain assay are shown in Table 5. Unprotected lipid autooxidizes within 2 days, whereas BHA, BHT, and PG protect the lipid for 8–14 days. Native lignin actually speeds up the autooxidtion process. unmodified APPL has a small protective effect on the lipid, but once it is reduced it gives significant protection (3.5 days). By first degrading the APPL's with acid (HCl) prior to reducing them, we further increase their antioxidant capabilities (to 4 days protection). By oxidizing the APPL's (with peroxide) prior to reducing them, we increase protective properties to 5 days, which approaches the protective ability of BHA. Finally, by oxidizing under basic conditions, an ether-extractable fraction is produced which gives protection for 4–4.5 days, and a polymeric fraction which gives protection for 3–3.5 days.

TABLE 5

Antioxidant Properties of Lignin and APPL's as Compared with BHA, BHT and Propyl Gallate (PG), Using Safflower Oil as the Oxidizable Lipid

| Added to Final Conc. Safflower Oil | Days Protected |
| --- | --- |
| None | 2 |
| BHA | 8 |
| BHT | 12 |
| PG | 14 |
| Native Lignin | 1.5 |
| APPL | 2–2.5 |
| Reduced APPL | 3.5 |
| Acid Degraded APPL | 2 |
| Acid Degraded - Then Reduced APPL | 4 |
| Oxidized - Then Reduced APPL | 5 |
| Basic Oxidation | 3–3.5 |
| Ether Extractables | 4–4.5 |

These results demonstrate that the APPL yields products which are useful, particularly when modified, as antioxidants, e.g. for food products (especially foods with lipid content), fuel oils, plastics, tire rubber etc. The non-carcinogenicity of such APPL products enables use of corresponding higher concentrations than are used for current antioxidants. Modified APPL concentrations may be used at levels which yield equivalent antioxidation capacity to concentrations of other antioxidants currently in use, subject to the FDA upper limit of 0.1% by weight of lipid.

What is claimed is:

1. A process for converting native lignin to an acid precipitable polymeric product characterized by an increased number of phenolic hydroxyl groups and carboxylic acid groups relative to said native lignin, said process comprising the steps of incubating said native lignin in a culture medium with a bacterium of the genus Streptomyces known to degrade lignin, extracting said incubated culture medium with an aqueous solvent, acidifying said extract, and collecting the resulting precipitate.

2. The process claimed in claim 1 wherein said Streptomyces is selected from the class consisting of *S. viridosporus, S. setonii,* and *S. badius.*

3. The process claimed in claim 2 wherein said Streptomyces is a strain selected from the class consisting of the cell-lines having the characteristics of ATCC Nos. 39,115, 39,116, and 39,117.

4. An acid precipitable polymeric lignin product formed from native lignin by a process comprising incubating said native lignin in a culture medium with a bacterium of the genus Streptomyces known to degrade lignin, extracting said incubated culture medium with an aqueous solvent, acidifying said extract, and collecting the resulting precipitate.

5. A process for converting native lignin to an acid precipitable polymeric product characterized by an increased number of phenolic hydroxyl groups and carboxylic acid groups relative to said native lignin, said process comprising the steps of incubating said native lignin in a culture medium with a microorganism selected from the group consisting of bacteria of the genus Streptomycese known to degrade lignin and white rot fungi of the species *Coriolus versicolor* or *Phanerochaete chrysosporium* that are known to degrade lignin, extracting said incubated culture medium with an aqueous solvent, acidifying said extract, and collecting the resulting precipitate.

6. An acid precipitable polymeric lignin product formed from native lignin by a process comprising incubating said native lignin in a culture medium with a microorganism selected from the group consisting of bacteria of the genus Streptomyces and white rot fungi known to degrade lignin of the species *Phanerochaete chrysosporium* or *Coliolus versicolor* that are known to degrade lignin, extracting said incubated culture medium with an aqueous solvent, acidifying said extract, and collecting the resulting precipitate.

7. The lignin product of claim 6 wherein said product has a molecular weight of at least 12,000 daltons and comprises by percentage of total weight, at least three times the number of phenolic hydroxyl groups and carboxylic acid groups present in said native lignin.

8. The lignin product of claim 6 wherein said product yields, upon chemical oxidation, at least three times the number of single-ring phenolic compounds yielded by chemical oxidation of said native lignin.

9. The lignin product of claim 6 wherein chemical oxidation of said product yields single-ring phenolic compounds amounting to at least 25% by weight of said product.

10. The lignin product of claim 9 wherein at least one-half of said single-ring compounds are selected from the class consisting of p-hydroxybenzoic acid, 4-hydroxy-3 methoxybenzoic acid, and 4-hydroxy-3, 5-dimethoxy benzoic acid.

11. The lignin product of claim 6 wherein said native lignin is a grass lignin.

* * * * *

UNITED STATES PATENT OFFICE
CERTIFICATE OF CORRECTION

Patent No. 4,478,747   Dated October 23, 1984

Inventor(s) Don L. Crawford et al.

It is certified that error appears in the above-identified patent and that said Letters Patent are hereby corrected as shown below:

Column 1, line 42, "hydroxyl" is misspelled;

Column 2, line 51, "increases" should be --increase--;

Column 2, line 66, "groups" should be --group--;

Column 2, line 66, "hydroxybenzoid" should be --hydroxybenzoic--;

Column 2, line 67, "benzoid" should be --benzoic--;

Column 2, line 68, "dimethyl" should be --dimethoxy--;

Column 3, line 7, delete "b" before "5%";

Column 3, line 9, "coumaric" is misspelled;

Column 4, line 10, delete "was";

UNITED STATES PATENT OFFICE
CERTIFICATE OF CORRECTION

Patent No. 4,478,747    Dated October 23, 1984

Inventor(s) Don L. Crawford et al.

It is certified that error appears in the above-identified patent and that said Letters Patent are hereby corrected as shown below:

Column 8, line 3, the formula should read:

"W = 2dh (o.1 cm)/(2.5)(D)";

Column 9, line 30, delete "the";

Column 9, line 63, delete "or", second occurrence;

Column 11, line 2, "autooxidation" is misspelled;

Column 11, line 3, "unmodified" should be
--Unmodified--.

Signed and Sealed this

Third Day of September 1985

[SEAL]

Attest:

DONALD J. QUIGG

Attesting Officer    Acting Commissioner of Patents and Trademarks - Designate